US010737623B2

(12) United States Patent
Banerjee et al.

(10) Patent No.: US 10,737,623 B2
(45) Date of Patent: Aug. 11, 2020

(54) CLOAKING DEVICES

(71) Applicants: Toyota Motor Engineering & Manufacturing North America, Inc., Erlanger, KY (US); Toyota Jidosha Kabushiki Kaisha, Toyota (JP)

(72) Inventors: Debasish Banerjee, Ann Arbor, MI (US); Chengang Ji, Ann Arbor, MI (US); Mayu Takagi, Nagoya (JP)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 667 days.

(21) Appl. No.: 15/435,996

(22) Filed: Feb. 17, 2017

(65) Prior Publication Data
US 2018/0147992 A1    May 31, 2018

Related U.S. Application Data

(60) Provisional application No. 62/428,104, filed on Nov. 30, 2016.

(51) Int. Cl.
*B60R 1/10* (2006.01)
*G02B 3/06* (2006.01)
(Continued)

(52) U.S. Cl.
CPC ............... *B60R 1/10* (2013.01); *F41H 5/26* (2013.01); *G02B 3/06* (2013.01); *G02B 13/0095* (2013.01); *G02B 17/008* (2013.01); *G02B 17/08* (2013.01)

(58) Field of Classification Search
CPC .. G02B 27/0966; G02B 19/0014; G02B 3/06; G02B 19/0052; G02B 27/0927;
(Continued)

(56) References Cited

U.S. PATENT DOCUMENTS 5,941,596 A    8/1999  See
9,405,118 B1   8/2016  Lu
(Continued)

FOREIGN PATENT DOCUMENTS

CN    103287340    9/2013
JP    2010023816   2/2010
(Continued)

OTHER PUBLICATIONS

Hiongsheng Chen et al, "Broadband polygonal invisibility cloak for visible light", Scientific Reports, Feb. 9, 2012, pp. 1-14.
(Continued)

*Primary Examiner* — Thomas K Pham
*Assistant Examiner* — Sharrief I Broome
(74) *Attorney, Agent, or Firm* — Dinsmore & Shohl LLP (57) ABSTRACT

According to one or more embodiments described herein, a cloaking device may comprise a first mirror, a second mirror, a third mirror, and a fourth mirror. The cloaking device may further comprise a first lens, a second lens, a third lens, and a fourth lens. Each of the first lens, the second lens, the third lens, and the fourth lens may be achromatic cylindrical lenses, or each of the first lens, the second lens, the third lens, and the fourth lens may be acylindrical lenses.

22 Claims, 9 Drawing Sheets

(51) Int. Cl.
*G02B 17/00* (2006.01)
*G02B 13/00* (2006.01)
*F41H 5/26* (2006.01)
*G02B 17/08* (2006.01)

(58) Field of Classification Search
CPC ............ G02B 19/0028; G02B 27/0961; G02B 3/005; G02B 19/0057; G02B 27/09; G02B 3/00; G02B 27/0905; G02B 27/0988; G02B 3/0056; G02B 5/0278; G02B 13/08; G02B 27/0944; G02B 27/095; G02B 27/0977; G02B 27/46; H01S 5/4025; H01S 5/005; H01S 3/005; H01S 3/0064; H01S 3/0805; H01S 3/2333; H01S 3/235; H01S 3/2341; H01S 5/4012; H01S 3/08; H01S 3/08059; H01S 3/0813; H01S 3/2325; G11B 7/22; G11B 7/1374; G11B 7/0956; G11B 7/1378; G11B 7/13922; G11B 7/1398; G11B 11/10536; G11B 11/1058; G11B 2005/0005; G11B 2005/0021; G11B 5/314; G11B 5/6088; G11B 7/08; G11B 7/082; G11B 7/0933; G11B 7/0935; G11B 7/1356; G11B 7/1362; G11B 7/1376; G11B 7/1387
See application file for complete search history.

(56) References Cited

U.S. PATENT DOCUMENTS

| | | | |
|---|---|---|---|
| 2014/0363338 A1* | 12/2014 | Sukegawa | G01J 3/0291 422/82.09 |
| 2015/0183375 A1* | 7/2015 | Wu | G02B 17/023 359/734 |
| 2015/0219881 A1* | 8/2015 | Munro | G02B 13/18 359/663 |
| 2015/0248013 A1 | 9/2015 | Chen et al. | |
| 2015/0296144 A1* | 10/2015 | Kline | H04N 5/335 348/122 |
| 2016/0025956 A1* | 1/2016 | Choi | G02B 1/007 359/730 |
| 2016/0231543 A1* | 8/2016 | Munro | G02B 13/08 |

FOREIGN PATENT DOCUMENTS

| | | |
|---|---|---|
| JP | 2015077927 | 4/2015 |
| WO | 2015171609 | 11/2015 |
| WO | 2015190310 | 12/2015 |

OTHER PUBLICATIONS

John C. Howell et al., "Simple, broadband, optical spatial cloaking of very large objects", Department of Physics and Astronomy, University of Rochester, www.physics.optics, arXiv:1306.0863 </abs/1306.0863> [physics.optics], Jun. 2013.

Yihao Yang et al., "Towards omnidirectional, large scale, full polarization, and broadband practical invisibility aloaks: challenges and progress", EPJ Appl. Metamat. 2014, 1, 7.

"Cloaking device uses ordinary lenses to hide objects across range of angles"; http://www.rochester.edu/newscenter/watch-rochester-cloak-uses-ordinary-lenses-to-hide-objects-across-continuous-range-of-angles-70592/; Published/accessed: Sep. 25, 2014.

* cited by examiner

CLOAKING DEVICES

CROSS-REFERENCE TO RELATED APPLICATIONS

This application claims the benefit of U.S. Provisional Application No. 62/428,104, entitled "CLOAKING DEVICES", filed Nov. 30, 2016, the entirety of which is hereby incorporated by reference.

TECHNICAL FIELD

The present specification generally relates to apparatuses and methods for making an object appear transparent and, more specifically, to cloaking devices.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" though the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device may comprise a first mirror, a second mirror, a third mirror, and a fourth mirror. The first mirror, the second mirror, the third mirror, and the fourth mirror may be configured to direct incoming light around a cloaked region such that incoming light reflects off of the first mirror and towards the second mirror, reflects off of the second mirror and towards the third mirror, reflects off of the third mirror and towards the fourth mirror, and reflects off of the fourth mirror and towards a viewer. The cloaking device may further comprise a first lens, a second lens, a third lens, and a fourth lens. The first lens may be positioned to receive the incoming light and project the incoming light onto the first mirror, and the fourth lens may be position to receive reflected light from the fourth mirror and project the reflected light towards the viewer. Each of the first lens, the second lens, the third lens, and the fourth lens may be achromatic cylindrical lenses, or each of the first lens, the second lens, the third lens, and the fourth lens may be acylindrical lenses.

According to another embodiment, a cloaking device may comprise a first mirror, a second mirror, a third mirror, a fourth mirror, a fifth mirror, a sixth mirror, a seventh mirror, and an eighth mirror. The first mirror, the second mirror, the third mirror, and the fourth mirror may be configured to direct incoming light around a cloaked region such that incoming light reflects off of the first mirror and towards the second mirror, reflects off of the second mirror and towards the third mirror, reflects off of the third mirror and towards the fourth mirror, and reflects off of the fourth mirror and towards a viewer. The fifth mirror, the sixth mirror, the seventh mirror, and the eighth mirror may be configured to direct incoming light around the cloaked region such that incoming light reflects off of the fifth mirror and towards the sixth mirror, reflects off of the sixth mirror and towards the seventh mirror, reflects off of the seventh mirror and towards the eighth mirror, and reflects off of the eighth mirror and towards the viewer. The cloaking device may further comprise a first lens, a second lens, a third lens, and a fourth lens, a fifth lens, a sixth lens, a seventh lens, and an eighth lens. The first lens may be positioned to receive the incoming light and project the incoming light onto the first mirror, and the fourth lens may be position to receive reflected light from the fourth mirror and project the reflected light towards the viewer. The fifth lens may be positioned to receive the incoming light and project the incoming light onto the fifth mirror, and the eighth lens may be position to receive reflected light from the eighth mirror and project the reflected light towards the viewer. Each of the first lens, the second lens, the third lens, the fourth lens, the fifth lens, the sixth lens, the seventh lens, and the eighth lens may be achromatic cylindrical lenses, or each of the first lens, the second lens, the third lens, the fourth lens, the fifth lens, the sixth lens, the seventh lens, and the eighth lens may be acylindrical lenses.

According to another embodiment, a vehicle may comprise a pillar and a cloaking device. The pillar may be at least partially within a cloaked region of the cloaking device. The cloaking device may comprise a first mirror, a second mirror, a third mirror, and a fourth mirror. The first mirror, the second mirror, the third mirror, and the fourth mirror may be configured to direct incoming light around a cloaked region such that incoming light reflects off of the first mirror and towards the second mirror, reflects off of the second mirror and towards the third mirror, reflects off of the third mirror and towards the fourth mirror, and reflects off of the fourth mirror and towards a viewer. The cloaking device may further comprise a first lens, a second lens, a third lens, and a fourth lens. The first lens may be positioned to receive the incoming light and project the incoming light onto the first mirror, and the fourth lens may be position to receive reflected light from the fourth mirror and project the reflected light towards the viewer. Each of the first lens, the second lens, the third lens, and the fourth lens may be achromatic cylindrical lenses, or each of the first lens, the second lens, the third lens, and the fourth lens may be acylindrical lenses.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a plurality of mirrors and lenses which direct incoming light around a cloaked region. The cloaking devices described herein may utilize cylindrical lenses, such as achromatic cylindrical lenses or acylindrical lenses. The cloaking devices 100 described herein may be used to cloak vehicle articles such as a vehicle A-pillar, B-pillar, C-pillar, D-pillar, etc., and remove a "blind spot" caused by the vehicle article. The utilization of achromatic cylindrical lenses or acylindrical lenses enhances the viewed image quality, allowing a driver to perceive an image which, if not for the cloaking device, would be covered by a pillar of the vehicle.

Figure 1:
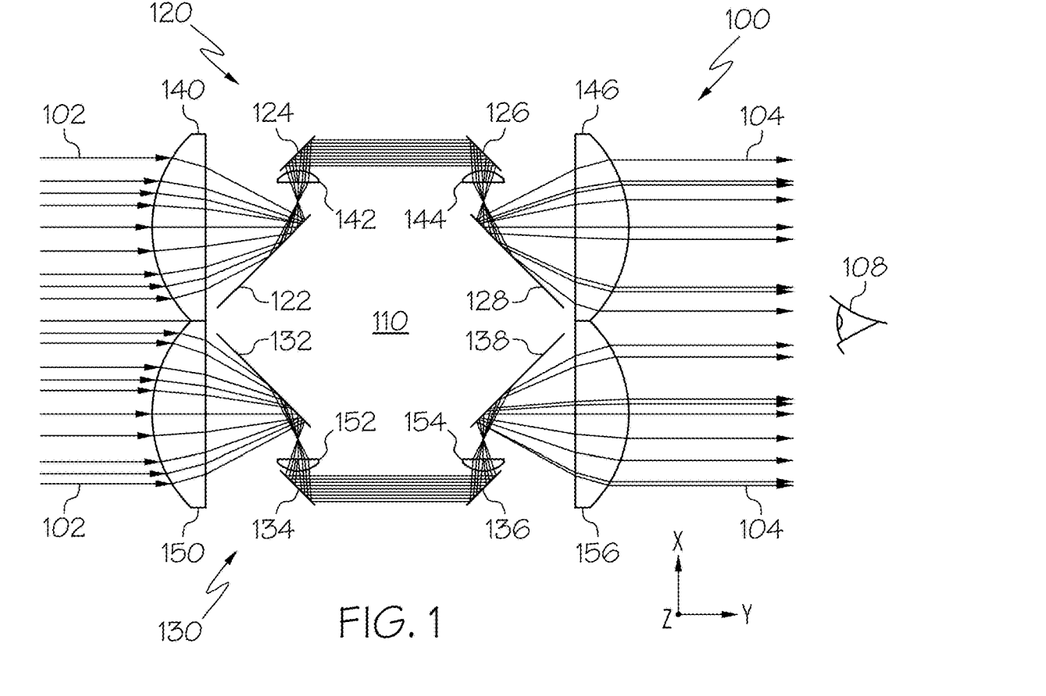
FIG. 1 schematically depicts a top view of a cloaking device, according to one or more embodiments described herein.

The cloaking device, according to the embodiment of FIG. 1, comprises a first mirror apparatus 120 and a second mirror apparatus 130. The first mirror apparatus 120 may comprise a first mirror 122, a second mirror 124, a third mirror 126, and a fourth mirror 128. Similar to the first mirror apparatus 120, the second mirror apparatus 130 may comprise a fifth mirror 132, a sixth mirror 134, a seventh mirror 136, and a eighth mirror 138. The first mirror apparatus 120 and second mirror apparatus 130 may at least partially surround the cloaked region 110 and may respectively reflect incoming light 102 around the cloaked region 110 and towards a viewer 108. In some embodiments, the first mirror apparatus 120 and second mirror apparatus 130 may be substantially symmetric with respect to one another. Additionally, disposed within the path of light propagation of the first mirror apparatus 120 are a first lens 140, a second lens 142, a third lens 144, and a fourth lens 146, and disposed within the path of light propagation of the second mirror apparatus 130 are a fifth lens 150, a sixth lens 152, a seventh lens 154, and a eighth lens 156.

As depicted in FIG. 1, the first mirror 122, the second mirror 124, the third mirror 126, and the fourth mirror 128 may be configured to direct incoming light 102 around the cloaked region 110 and towards the viewer 108. As shown in FIG. 1, the incoming light 102 may reflect off of the first mirror 122 and towards the second mirror 124, reflect off of the second mirror 124 and towards the third mirror 126, reflect off of the third mirror 126 and towards the fourth mirror 128, and finally reflect off of the fourth mirror 128 as outgoing light 104 directed towards the viewer 108.

Similar to the first mirror apparatus 120, the second mirror apparatus 130 may comprise a fifth mirror 132, a sixth mirror 134, a seventh mirror 136, and a eighth mirror 138. The fifth mirror 132, the sixth mirror 134, the seventh mirror 136, and the eighth mirror 138 may be configured to direct incoming light 102 around the cloaked region 110 and towards the viewer 108. As shown in FIG. 1, the incoming light 102 may reflect off of the fifth mirror 132 and towards the sixth mirror 134, reflect off of the sixth mirror 134 and towards the seventh mirror 136, reflect off of the seventh mirror 136 and towards the eighth mirror 138, and finally reflect off of the eighth mirror 138 as outgoing light 104 directed towards the viewer 108.

As described herein, a mirror (such as one or more of the first mirror 122, the second mirror 124, the third mirror 126, the fourth mirror 128, the fifth mirror 132, the sixth mirror 134, the seventh mirror 136, and the eighth mirror 138) refers to a material comprising a reflective surface, wherein the reflective surface may have reflectivity of at least about 50%, at least about 60%, at least about 70%, at least about 80%, at least about 90%, at least about 95%, at least about 96%, at least about 97%, at least about 98%, at least about 99%, or even at least 99.5% for all wavelengths between about 400 nm and 700 nm. According to one or more embodiments, one or more of the first mirror 122, the second mirror 124, the third mirror 126, the fourth mirror 128, the fifth mirror 132, the sixth mirror 134, the seventh mirror 136, and the eighth mirror 138 are substantially flat.

As depicted in FIGS. 1-6, one or more lenses, such as the first lens 140, the second lens 142, the third lens 144, the fourth lens 146, the fifth lens 150, the sixth lens 152, the seventh lens 154, and the eighth lens 156, are positioned in the path of propagation of the incoming light 102. Referring to the first mirror apparatus 120 of the cloaking device 100 of FIG. 1, according to one or more embodiments, the first lens 140 may be positioned to receive the incoming light 102 and project the incoming light 102 onto the first mirror 122. The fourth lens 146 may be position to receive reflected light from the fourth mirror 128 and project the reflected light towards the viewer 108. Similarly, according to one or more embodiments, the fifth lens 150 may be positioned to receive the incoming light 102 and project the incoming light 102 onto the fifth mirror 132. The eighth lens 156 may be positioned to receive reflected light from the eighth mirror 138 and project the reflected light towards the viewer 108.

Figure 2:
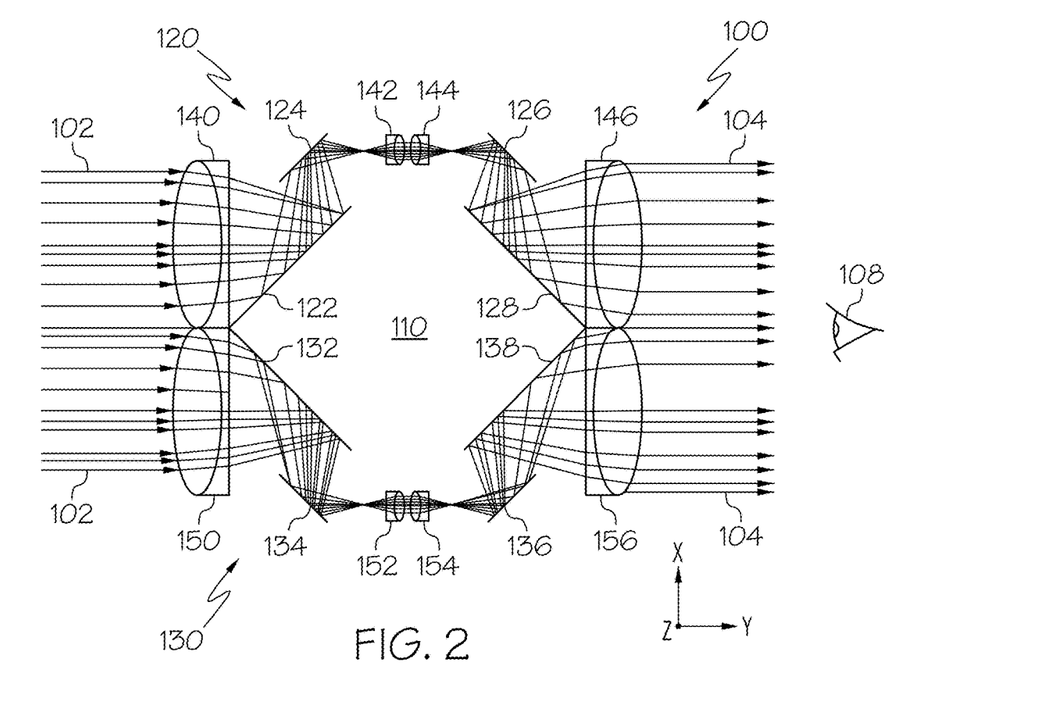
FIG. 2 schematically depicts a top view of a cloaking device, according to another embodiment described herein.

In one or more embodiments, as depicted in FIG. 1, the second lens 142 may be positioned between the first mirror 122 and the second mirror 124. In such an embodiment, the third lens 144 may be positioned between the third mirror 126 and the fourth mirror 128. Similarly the sixth lens 152 may be positioned between the fifth mirror 132 and the sixth mirror 134, and the seventh lens 154 may be positioned between the seventh mirror 136 and the eighth mirror 138. According to another embodiment, such as depicted in FIG. 2, the second lens 142 and the third lens 144 may be positioned between the second mirror 124 and the third mirror 126. Similarly, the sixth lens 152 and the seventh lens 154 may be positioned between the sixth mirror 134 and the seventh mirror 136.

According to one or more embodiments, one or more of the first lens 140, the second lens 142, the third lens 144, the fourth lens 146, the fifth lens 150, the sixth lens 152, the seventh lens 154, and the eighth lens 156 may be cylindrical lenses such as achromatic cylindrical lenses or acylindrical lenses. As described herein, a "cylindrical lens" refers to a lens which focuses light into a line rather than a point (as a spherical lens would do). In some embodiments, cylindrical lenses may have a profile which is constant with respect to one direction (such as the z direction in FIG. 1). In some embodiments, the one or more curved faces of a cylindrical lens may be sections of a cylinder. However, in other embodiments, the curved surface is not a section of a cylinder (such as an acylindrical lens). One or more of the first lens 140, the second lens 142, the third lens 144, the fourth lens 146, the fifth lens 150, the sixth lens 152, the seventh lens 154, and the eighth lens 156 may be glass, plastic, or any other suitable substantially transparent material.

According to another embodiment, one or more of the first lens 140, the second lens 142, the third lens 144, the fourth lens 146, the fifth lens 150, the sixth lens 152, the seventh lens 154, and the eighth lens 156 may be acylindrical lenses. As used herein, an "acylindrical" lens refers to cylindrical lenses comprising an aspheric profile. Acylindrical lenses may reduce aberrations such as astigmatism. Aspheric profiles, in some embodiments, may be described by the aspheric lens equation:

$$z = \frac{Y^2}{R(1 + \sqrt{1 - (1+k)Y^2/R^2})} + A_4Y^4 + A_6Y^6 + A_8Y^8 + A_{10}Y^{10} + A_{12}Y^{12} + A_{14}Y^{14} + \ldots$$

Figure 15:
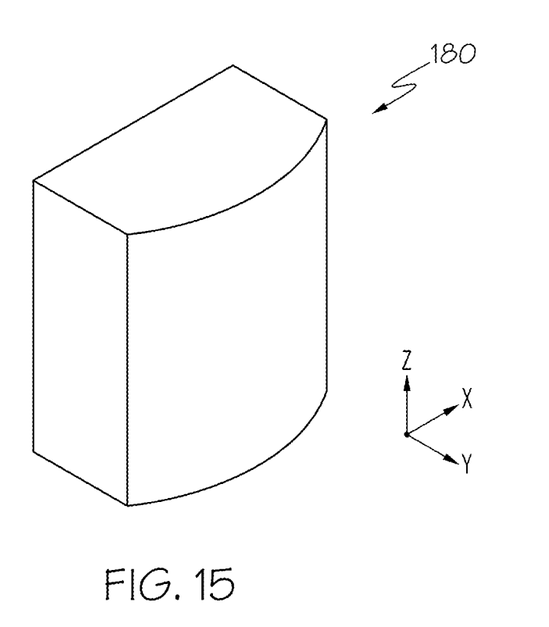
FIG. 15 schematically depicts a perspective view of an acylindrical lens, according to one or more embodiments described herein.

Examples of suitable acylindrical lenses include the AYL5040-A lens or AYL108-A lens (each commercially available from Thorlabs, Inc. of Newton, N.J.). A perspective view of an acylindrical lens 180 is depicted in FIG. 15.

In one embodiment, each of the first lens 140, the second lens 142, the third lens 144, and the fourth lens 146 are acylindrical lenses. In another embodiment, each of the fifth lens 150, the sixth lens 152, the seventh lens 154, and the eighth lens 156 are acylindrical lenses. According to another embodiment, each of the first lens 140, the second lens 142, the third lens 144, the fourth lens 146, the fifth lens 150, the sixth lens 152, the seventh lens 154, and the eighth lens 156 may be acylindrical lenses.

According to additional embodiments, one or more of the first lens 140, the second lens 142, the third lens 144, the fourth lens 146, the fifth lens 150, the sixth lens 152, the seventh lens 154, and the eighth lens 156 may be a plano-convex acylindrical lens.

According to one embodiment, one or more of the first lens 140, the second lens 142, the third lens 144, the fourth lens 146, the fifth lens 150, the sixth lens 152, the seventh lens 154, and the eighth lens 156 may be achromatic cylindrical lenses. As used herein, an "achromatic cylindrical" lens refers to a compound cylindrical lens that is designed to limit the effect of chromatic and spherical aberration. An achromatic cylindrical lens may generally bring two light wavelengths (such as red and blue) into focus in the same plane. According to some embodiments, the achromatic cylindrical lenses may be doublets. As used herein, a "doublet" refers to a lens comprising two individual lens components made from transparent materials with different amounts of dispersion. Typically, one of lens components comprises a negative (e.g., concave) element and one lens component comprises a positive (e.g., convex) element, where the two lens components are adjacent and attached to one another.

Figure 16:
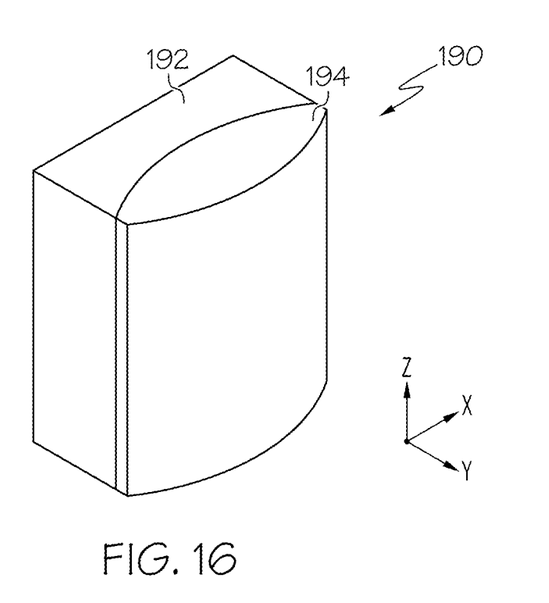
FIG. 16 schematically depicts a perspective view of an achromatic cylindrical lens, according to one or more embodiments described herein.

A perspective view of an achromatic cylindrical lens 160 is shown in FIG. 16. The achromatic cylindrical lens 190 includes a first lens component 192 and a second lens component 194 (i.e., a doublet). Examples of suitable achromatic cylindrical lenses include the AC080-010-A lens or the AC080-010-A lens (each commercially available from Thorlabs, Inc. of Newton, N.J.).

According to additional embodiments, one or more of the first lens 140, the second lens 142, the third lens 144, the fourth lens 146, the fifth lens 150, the sixth lens 152, the seventh lens 154, and the eighth lens 156 may be a doublet lens. For example, the doublet lens comprises a biconvex lens component and a plano-concave lens component.

In one embodiment, each of the first lens 140, the second lens 142, the third lens 144, and the fourth lens 146 are achromatic cylindrical lenses. In another embodiment, each of the fifth lens 150, the sixth lens 152, the seventh lens 154, and the eighth lens 156 are achromatic cylindrical lenses. According to another embodiment, each of the first lens 140, the second lens 142, the third lens 144, the fourth lens 146, the fifth lens 150, the sixth lens 152, the seventh lens 154, and the eighth lens 156 may be achromatic cylindrical lenses.

It should be understood that, according to at least one embodiment of the cloaking device 100, the cloaking device 100 may include the first mirror apparatus 120 but not the second mirror apparatus 130, or vice versa. It should be understood that in embodiments where only the first mirror apparatus 120 or only the second mirror apparatus 130 is included, the lenses not affecting light incident to the utilized mirrors need not be included. For example, where the second mirror apparatus 130 is not included, the cloaking device 100 may include the first lens 140, the second lens 142, the third lens 144, and the fourth lens 146, and may not include the fifth lens 150, the sixth lens 152, the seventh lens 154, or the eighth lens 156.

As depicted in FIGS. 1-6, the boundary of the cloaked region 110 may be at least partially defined by one or more of the first mirror 122, the fourth mirror 128, the fifth mirror 132, and the eighth mirror 138. In one or more embodiments, one or more of the first mirror 122, the fourth mirror 128, the fifth mirror 132, and the eighth mirror 138 may be surfaces of a vehicle pillar. In additional embodiments, the first mirror 122 and the second mirror 124 may be about perpendicular relative to one another. Similarly, the fifth mirror 132 and the sixth mirror 134 may be about perpendicular relative to one another.

In one or more embodiments, the first mirror 122 may be about parallel with the second mirror 124, and/or the third mirror 126 may be about parallel with the fourth mirror 128. Similarly, in embodiments, the fifth mirror 132 may be about parallel with the sixth mirror 134, and/or the seventh mirror 136 may be about parallel with the eighth mirror 138. In additional embodiments, the first mirror 122 and the fourth mirror 128 may be perpendicular to one another, and/or the fifth mirror 132 and the eighth mirror 138 may be perpendicular to one another. In additional embodiments, the first mirror 122 may be about parallel with the second mirror 124, and/or the third mirror 126 may be about parallel with the fourth mirror 128. Similarly, the fifth mirror 132 may be about parallel with the sixth mirror 134, and/or the seventh mirror 136 may be about parallel with the eighth mirror 138.

As depicted in FIGS. 1-6 the first lens 140 may be adjacent to the fifth lens 150, and/or the fourth lens 146 may be adjacent to the eighth lens 156. In embodiments, the first lens 140 may be parallel to the fifth lens 150, and/or the fourth lens 146 may be parallel to the eighth lens 156. In additional embodiments, the second lens 142 and the third lens 144 may be perpendicular to the first lens 140 and/or the fourth lens 146. Similarly, the sixth lens 152 and the seventh lens 154 may be perpendicular to the fifth lens 150 and/or the eighth lens 156.

It should be appreciated that FIGS. 1-6 depict embodiments of cloaking devices 100 form a top view. As such, the cloaking devices 100 may have a height in the direction of the z-axis. For example, one or more of the first mirror 122, the second mirror 124, the third mirror 126, the fourth mirror 128, the fifth mirror 132, the sixth mirror 134, the seventh mirror 136, the eighth mirror 138, the first lens 140, the second lens 142, the third lens 144, the fourth lens 146, the fifth lens 150, the sixth lens 152, the seventh lens 154, or the eighth lens 156 may have a height in the direction of the z-axis of from about 1 m to about 10 mm, such as from about 50 cm to about 10 mm, from about 25 cm to about 10 mm, from about 100 mm to about 10 mm, or from about 50 mm to about 10 mm. In some embodiments, the height of one or more of the first mirror 122, the second mirror 124, the third mirror 126, the fourth mirror 128, the fifth mirror 132, the sixth mirror 134, the seventh mirror 136, the eighth mirror 138, the first lens 140, the second lens 142, the third lens 144, the fourth lens 146, the fifth lens 150, the sixth lens 152, the seventh lens 154, or the eighth lens 156 may have a height in the direction of the z-axis about the length of the A-pillar or B-pillar of a vehicle. In additional embodiments, the first mirror 122, the second mirror 124, the third mirror 126, the fourth mirror 128, the fifth mirror 132, the sixth mirror 134, the seventh mirror 136, the eighth mirror 138, the first lens 140, the second lens 142, the third lens 144, the fourth lens 146, the fifth lens 150, the sixth lens 152, the seventh lens 154, or the eighth lens 156 have about the same height (for example, within 10% of one another).

According to one or more embodiments, the first mirror 122 and the fourth mirror 128 may each have reflective surfaces that are larger than the reflective surfaces of either the second mirror 124 or the third mirror 126. Similarly, the fifth mirror 132 and eighth mirror 138 may each have reflective surfaces that are larger than the reflective surfaces of either the sixth mirror 134 or the seventh mirror 136.

According to one or more embodiments, one or more of the first mirror 122, the fourth mirror 128, the fifth mirror 132, or the eighth mirror 138 may have a length on the x-y plane of from about 20 mm to about 60 mm, such as from about 30 mm to about 50 mm, from about 30 mm to about 40 mm, from about 45 mm to about 55 mm, or from about 35 mm to about 45 mm. According to one or more embodiments, one or more of the second mirror 124, the third mirror 126, the sixth mirror 134, or the seventh mirror 136, may have a length on the x-y plane of from about 5 mm to about 30 mm, such as from about 10 mm to about 20 mm, from about 15 mm to about 25 mm, or from about 20 mm to about 30 mm.

In one or more embodiments, each of the first lens 140 and the eighth lens 156 may be larger than either of the second lens 142 or the third lens 144. Similarly, in embodiments, each of the fifth lens 150 and the eighth lens 156 may be larger than either of the sixth lens 152 or the seventh lens 154. According to one or more embodiments, one or more of the first lens 140, the fourth lens 146, the fifth lens 150, and the eighth lens 156 may have a width in the x-y plane of from about 20 mm to about 80 mm, such as from about 40 mm, to about 60 mm, from about 45 mm to about 55 mm, or from about 30 mm to about 40 mm. According to one or more embodiments, one or more of the second lens 142, the third lens 144, the sixth lens 152, and the seventh lens 154 may have a width of from about 2 mm to about 15 mm, such as from about 6 mm to about 10 mm.

In one or more embodiments, the cloaking device 100 may have a length in the y-axis direction (that of the incoming light 102 and outgoing light 104) as measured from the outer edge of the first lens 140 or fifth lens 150 to the outer edge of the fourth lens 146 or the eighth lens 156. In embodiments, the cloaking device may have a length in the y-axis direction of from about 25 mm to about 500 mm, such as from about 100 mm to about 200 mm. The cloaking area, according to one or more embodiments may be from about 10,000 mm$^2$ to about 10 mm$^2$, such as from about 7000 mm$^2$ to about 3000 mm$^2$.

Figure 7:
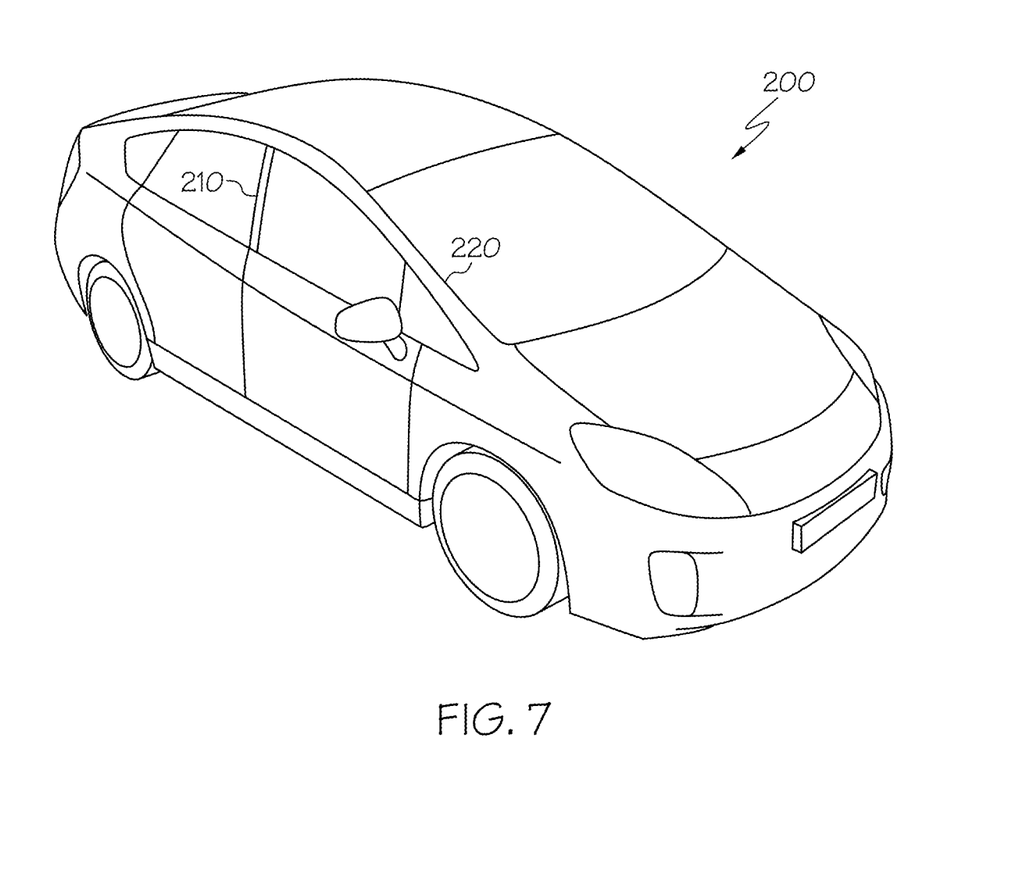
FIG. 7 schematically depicts a vehicle that includes a cloaking device, according to one or more embodiments described herein.
Figure 8:
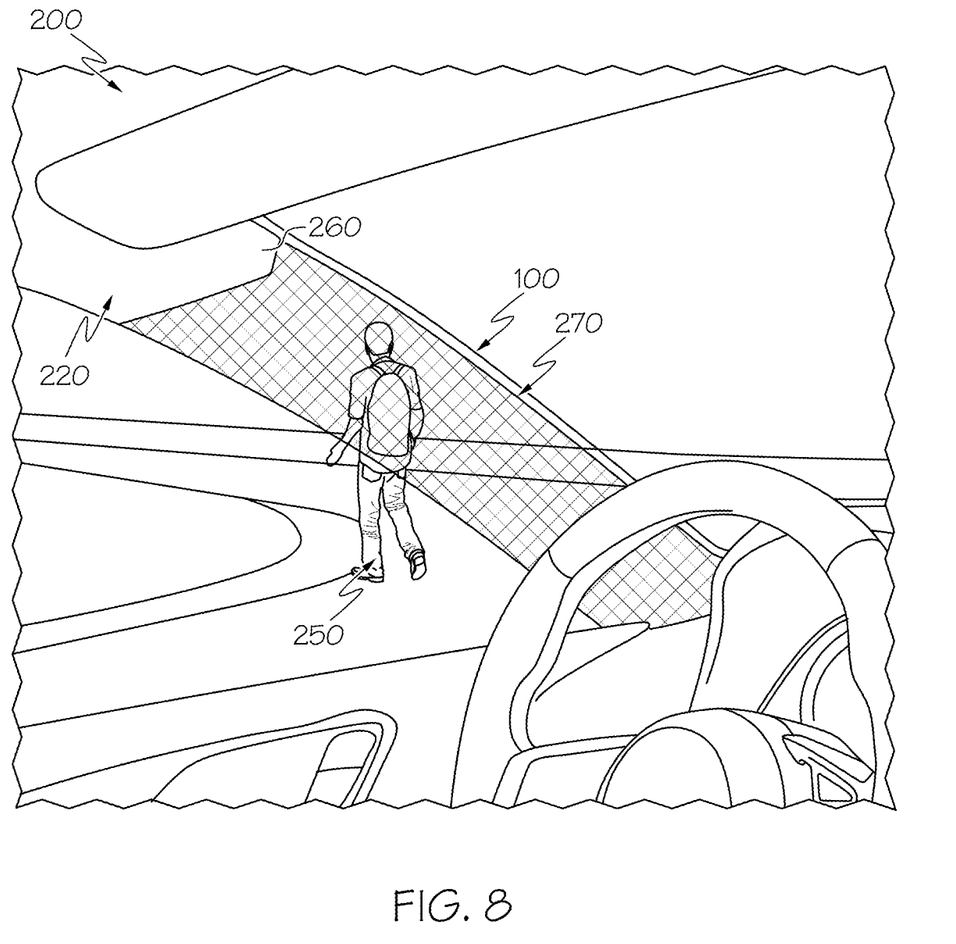
FIG. 8 schematically depicts a driver's view in a vehicle that includes a cloaking device, according to one or more embodiments described herein.

Now referring to FIGS. 7 and 8, embodiments of a pillar of a vehicle being cloaked by a cloaking device are shown. FIG. 7 shows a vehicle 200 which includes an A-pillar 220 and a B-pillar 210. The cloaking devices 100 described herein may at least partially surround the A-pillar 220 or B-pillar 210, where the A-pillar 220 or B-pillar 210 are at least partially in the cloaking region of the cloaking apparatus. Additionally, FIG. 8 shows a cloaking device 100 cloaking a portion of an A-pillar 220 of a vehicle 200 from approximately a driver's view. A portion of the A-pillar 220 is positioned within a cloaked region 110 (not shown) of the cloaking device 100 and a portion of the A-pillar 220 extends beyond the cloaking device and is covered with trim 260. Illustrated outside of the vehicle 200 is a target object 250 in the form of pedestrian. A portion of the target object 250 is visible through a side window of the vehicle 200 and a portion of the pedestrian is visible "through" the A-pillar 220 cloaked by the cloaking device 100. The cloaking device 100 redirects light reflected from the target object 250 around the A-pillar 220 positioned within the cloaked region of the cloaking device 100 and forms an image 270 of the target object 250 on an the cloaking device 100 that is visible to an occupant of the vehicle 200 looking towards the target object 250. Accordingly, light from the target object 250 appears to pass through the A-pillar 220 and a blind spot typically created by the A-pillar 220 is not present. In embodiments, the A-pillar 220 itself occupies at least a portion of the cloaked region. It should be appreciated that cloaking of the A-pillar 220 with the cloaking device 100 and removing the blind spot produced by the A-pillar 220 is performed without the use of metamaterials, video images, cameras, sophisticated electronics, etc. It should further be understood that the cloaking principles explained with relation to of FIGS. 7 and 8 can be applied to other portions of a vehicle, such as an A-pillar, B-pillar, C-pillar, D-pillar, etc. by positioning a cloaking device 100 around the respective pillar, where the pillar is at least partially within the cloaked region.

EXAMPLES

Various embodiments will be further clarified by the following examples. The examples should not be construed to limit the features described in the detailed description.

Example 1

A cloaking device was assembled based on the design of FIG. 1. The distance between the first lens 140 and the fourth lens 146 (in the y-axis direction) was 100 mm. The total length of the cloaking device 100 in the y-axis direction was 128 mm. The total length of the cloaking device 100 in the x-axis direction was 100 mm. The cloaked region 110 had an area of about 70 mm by 70 mm. All of the lenses utilized were acylindrical lenses. Specifically, the first lens 140, the fourth lens 146, the fifth lens 150, and the eighth lens were AYL5040-A lenses having a 50 mm length in the x-axis direction and a focal length of 8 mm (commercially available from Thorlabs, Inc.), and the second lens 142, third lens 144, sixth lens 152, and seventh lens 154 were AYL108-A lenses having a 10 mm length in the y-axis direction and a focal length of 8 mm (commercially available from Thorlabs, Inc.). The first mirror 122, fourth mirror 128, fifth mirror 132, and eighth mirror 138 had lengths in the x-y axis plane of 36 mm. The second mirror, 124, third mirror 126, sixth mirror 134, and seventh mirror 136 had lengths in the x-y axis plane of 14 mm. All mirrors had an orientation of 45° relative to the y-axis direction. All lenses had a height in the z-axis direction of 50 mm, achieved by utilizing multiple lenses arranged on top of one another in the z-axis direction.

Figure 9:
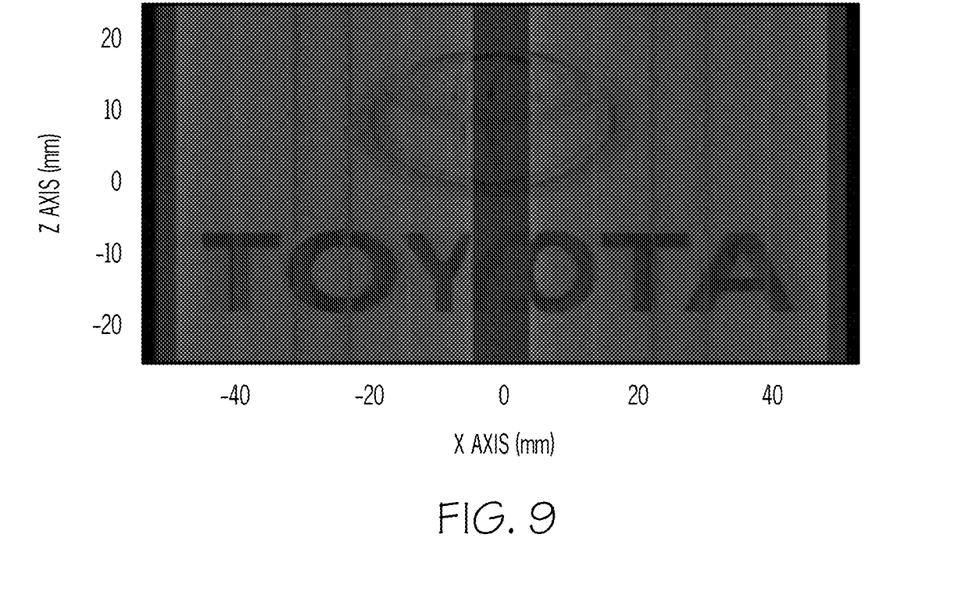
FIG. 9 depicts an image produced by the cloaking device of Example 1, according to one or more embodiments described herein.

FIG. 9 depicts the image produced to a viewer 108 by the cloaking device of Example 1. The output image was affected by chromatic aberrations as observed in FIG. 9.

Example 2

A cloaking device was assembled based on the design of FIG. 2. The distance between the first lens 140 and the fourth lens 146 (in the y-axis direction) was 108 mm. The total length of the cloaking device 100 in the y-axis direction was 144 mm. The total length of the cloaking device 100 in the x-axis direction was 119.2 mm. The cloaking region 110 had an area of about 70 mm by 70 mm. All of the lenses utilized were achromatic cylindrical circular lenses. Specifically, the first lens 140, the fourth lens 146, the fifth lens 150, and the eighth lens were circular AC508-080-A lenses having a 50.8 mm length in the x-axis direction and a focal length of 80 mm (commercially available from Thorlabs, Inc.), and the second lens 142, third lens 144, sixth lens 152, and seventh lens 154 were AC080-010-A lenses having a 8 mm length in the y-axis direction and a focal length of 10 mm (commercially available from Thorlabs, Inc.). As AC080-010-A lenses were circular, they were cut and stacked. The first mirror 122, fourth mirror 128, fifth mirror 132, and eighth mirror 138 had lengths in the x-y axis plane of 53 mm. The second mirror, 124, third mirror 126, sixth mirror 134, and seventh mirror 136 had lengths in the x-y axis plane of 21 mm. All mirrors had an orientation of 45° relative to the y-axis direction. All lenses had a height in the z-axis direction of 50.8 mm. The second mirror 124 and third mirror 126 extended past the first lens 140 and fourth lens 146 by 8.6 mm in the x-axis direction. Similarly, the sixth mirror 134 and seventh mirror 136 extended past the fifth lens 150 and eighth lens 156 by 8.6 mm in the x-axis direction.

Figure 10:
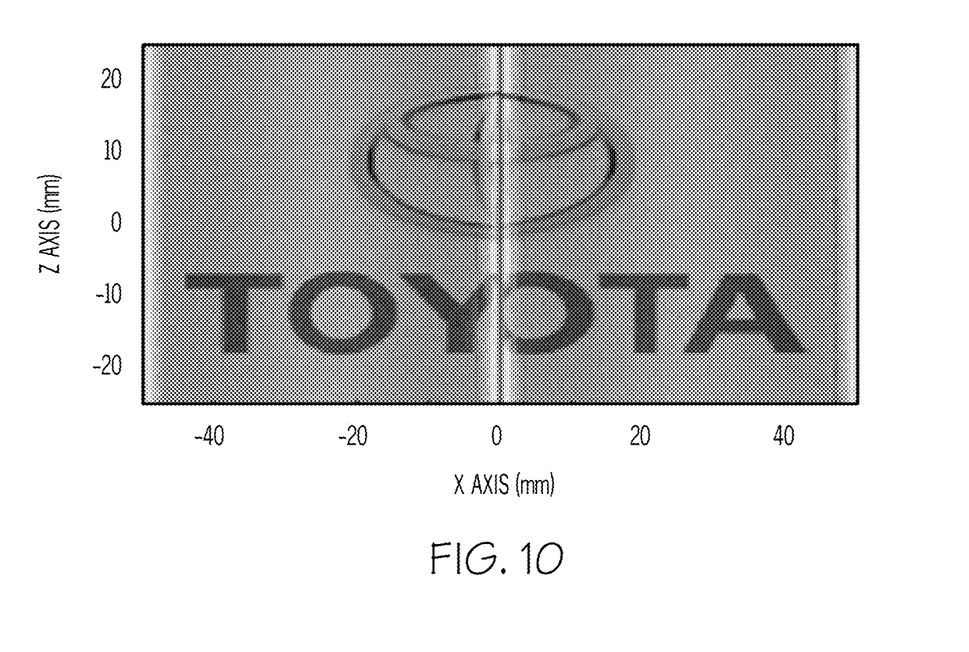
FIG. 10 depicts an image produced by the cloaking device of Example 2, according to one or more embodiments described herein.

FIG. 10 depicts the image produced to a viewer 108 by the cloaking device of Example 2. Most of the output image of FIG. 10 is free from the chromatic aberrations except for the narrow edges.

Example 3

Figure 3:
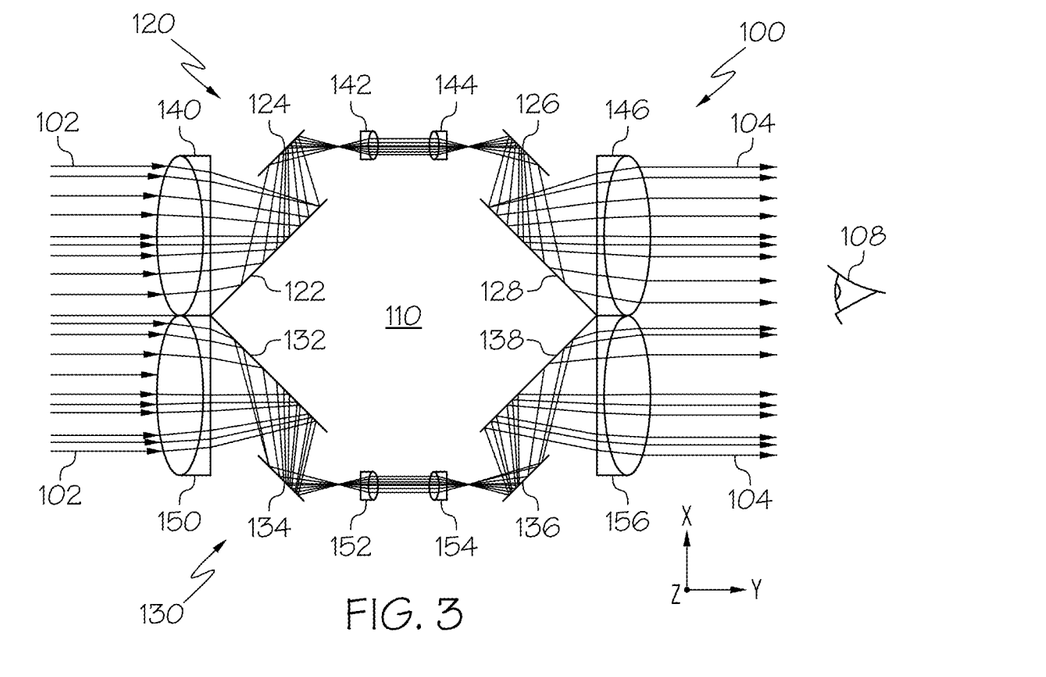
FIG. 3 schematically depicts a top view of a cloaking device, according to another embodiment described herein.

A cloaking device was assembled based on the design of FIG. 3. Example 3 is identical to Example 2, except that the cloaking device is extended in the y-axis direction. Specifically, the distance between the first lens 140 and the fourth lens 146 (in the y-axis direction) was 123 mm. The total length of the cloaking device 100 in the y-axis direction was 159 mm. The distance between the second lens 142 and the third lens 144, and the distance between the sixth lens and the seventh lens, was 15 mm.

Figure 11:
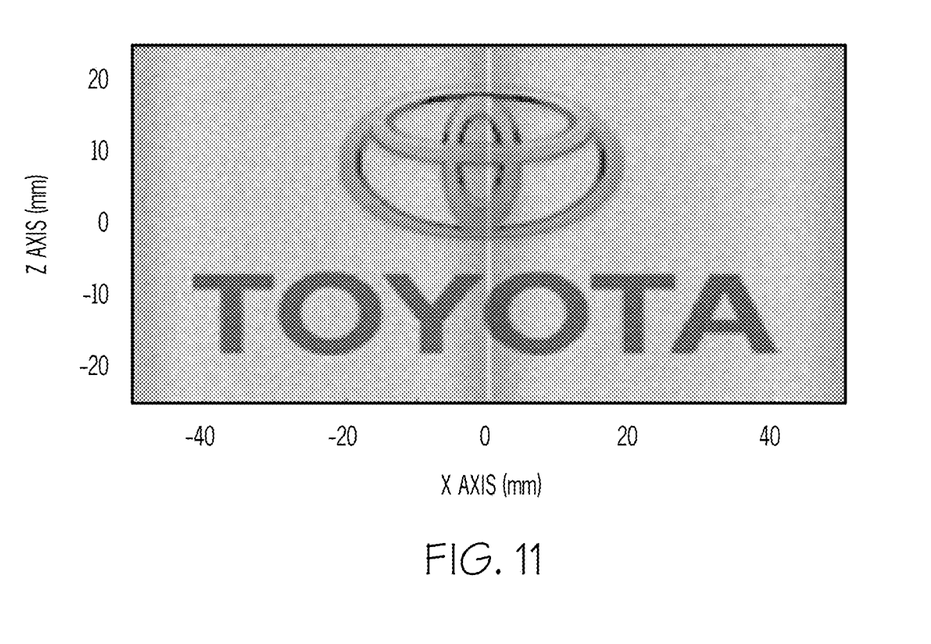
FIG. 11 depicts an image produced by the cloaking device of Example 3, according to one or more embodiments described herein.

FIG. 11 depicts the image produced to a viewer 108 by the cloaking device of Example 3. The elongation of the cloaking device corrected the chromatic aberrations observed Example 2.

Example 4

Figure 4:
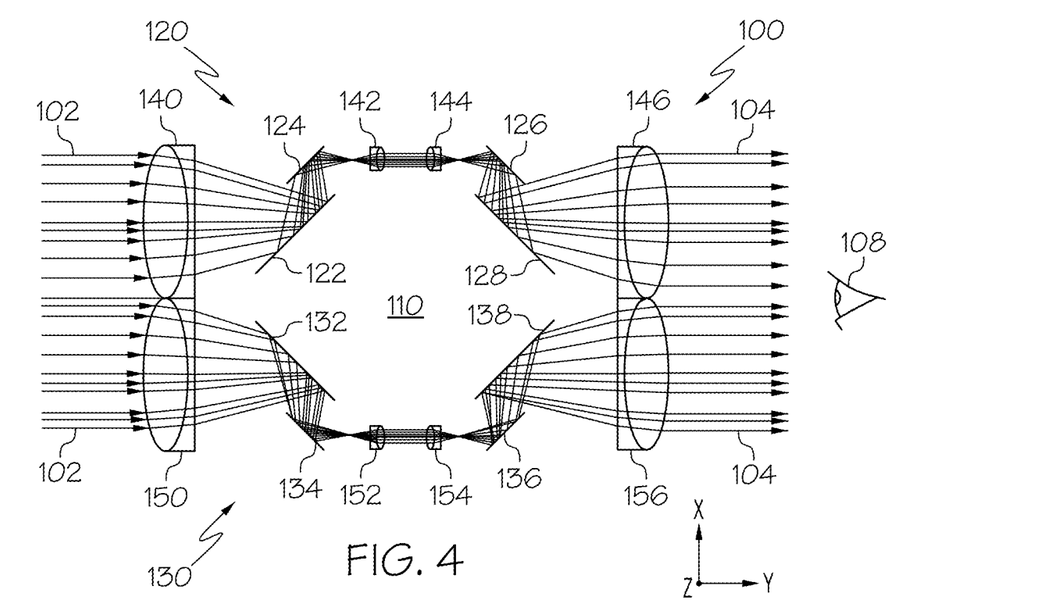
FIG. 4 schematically depicts a top view of a cloaking device, according to another embodiment described herein.

A cloaking device was assembled based on the design of FIG. 4. Example 4 is identical to Example 2, except that the cloaking device is extended in the y-axis direction and the second mirror 124 and third mirror 126 do not past the first lens 140 and fourth lens 146 in the x-axis direction. Similarly, the sixth mirror 134 and seventh mirror 136 do not extend past the fifth lens 150 and eighth lens 156 in the x-axis direction. The distance between the first lens 140 and the fourth lens 146 (in the y-axis direction) was 139 mm. The total length of the cloaking device 100 in the y-axis direction was 175 mm. The total length of the cloaking device 100 in the x-axis direction was 102 mm.

Figure 12:
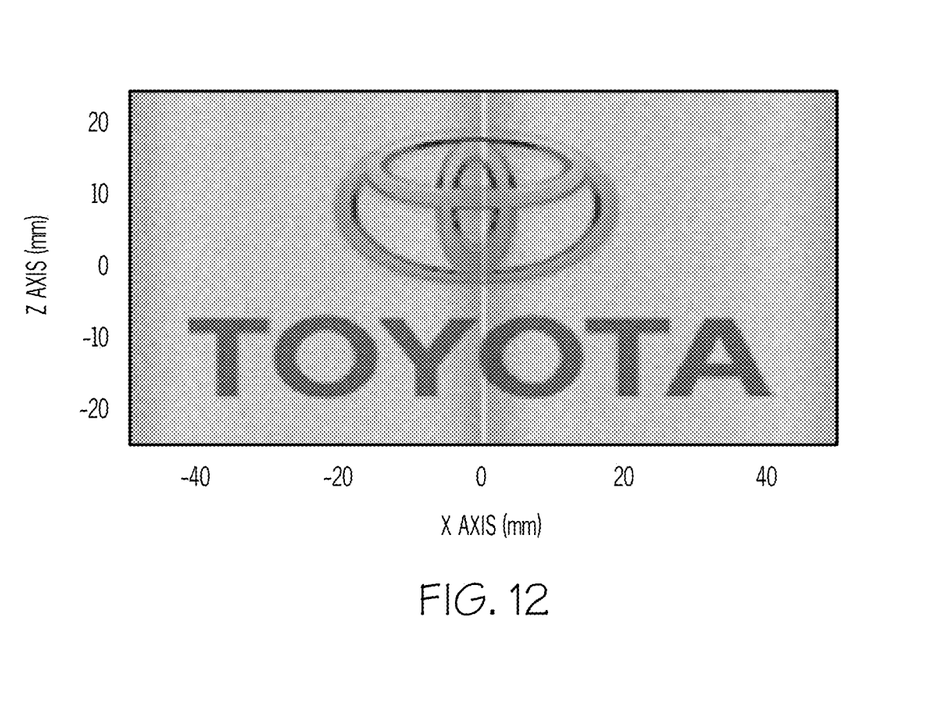
FIG. 12 depicts an image produced by the cloaking device of Example 4, according to one or more embodiments described herein.

FIG. 12 depicts the image produced to a viewer 108 by the cloaking device of Example 4. The elongation of the cloaking device corrected the chromatic aberrations observed Example 2, and had a narrower profile in the x-axis direction.

Example 5

Figure 5:
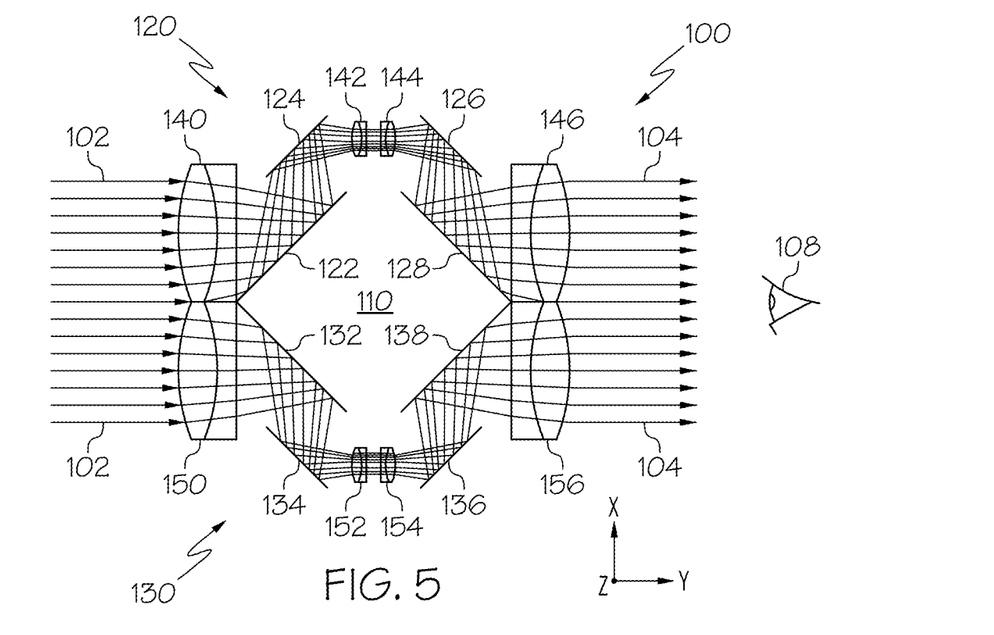
FIG. 5 schematically depicts a top view of a cloaking device, according to another embodiment described herein.
Figure 6:
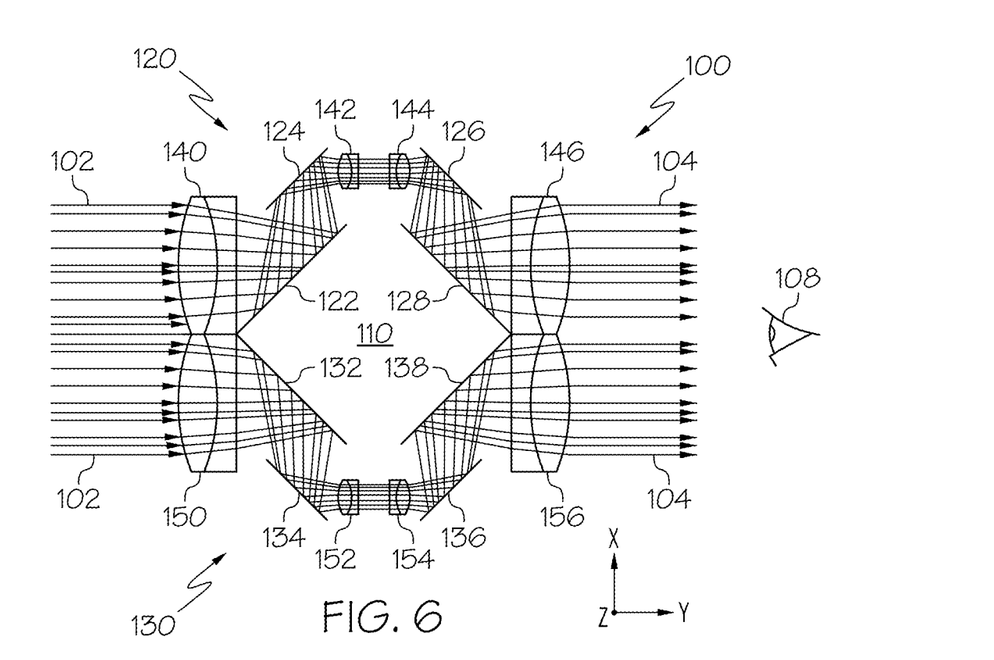
FIG. 6 schematically depicts a top view of a cloaking device, according to another embodiment described herein.

The cloaking device was assembled based on the design of FIG. 5. The distance between the first lens 140 and the fourth lens 146 (in the y-axis direction) was 70 mm. The total length of the cloaking device 100 in the y-axis direction was 106 mm. The total length of the cloaking device 100 in the x-axis direction was 95.6 mm. The cloaking region 110 had an area of about 50 mm by 50 mm. All of the lenses utilized were achromatic cylindrical circular lenses cut into squares. Specifically, the first lens 140, the fourth lens 146, the fifth lens 150, and the eighth lens were circular AC508-080-A lenses cut into squares having a 35 mm length in the x-axis direction and a focal length of 80 mm (commercially available from Thorlabs, Inc.), and the second lens 142, third lens 144, sixth lens 152, and seventh lens 154 were #48350 lenses cut into squares having a 8.8 mm length in the y-axis direction and a focal length of 15 mm (commercially available from Edmunds Optics, Inc.). The first mirror 122, fourth mirror 128, fifth mirror 132, and eighth mirror 138 had lengths in the x-y axis plane of 40 mm. The second mirror, 124, third mirror 126, sixth mirror 134, and seventh mirror 136 had lengths in the x-y axis plane of 22 mm. All mirrors had an orientation of 45° relative to the y-axis direction. The second mirror 124 and third mirror 126 extended past the first lens 140 and fourth lens 146 by 12.8 mm in the x-axis direction. Similarly, the sixth mirror 134 and seventh mirror 136 extended past the fifth lens 150 and eighth lens 156 by 12.8 mm in the x-axis direction.

Figure 13:
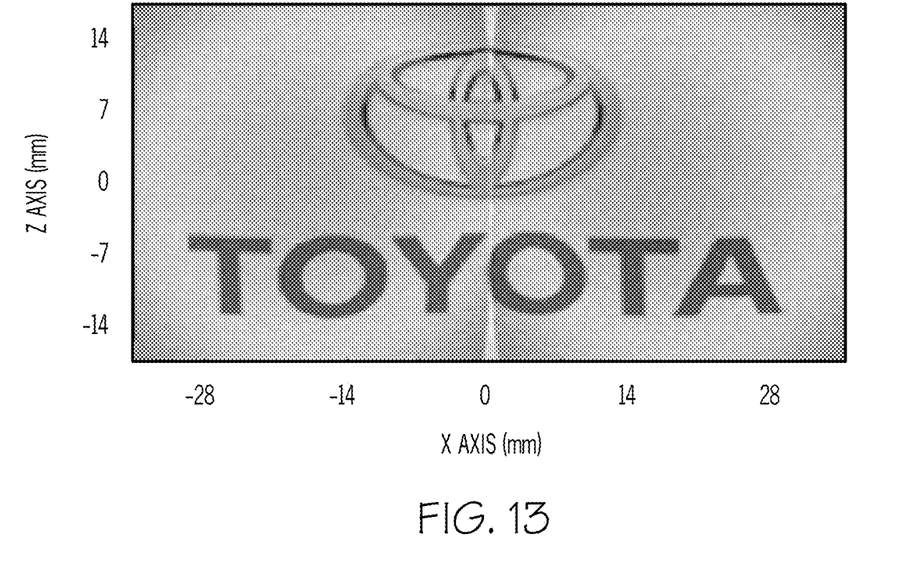
FIG. 13 depicts an image produced by the cloaking device of Example 5, according to one or more embodiments described herein.

FIG. 13 depicts and image produced to a viewer 108 by the cloaking device of Example 5. The chromatic aberrations of Example 2 were reduced by cutting the edges from the circular lenses.

Example 6

The distance between the first lens 140 and the fourth lens 146 (in the y-axis direction) was 100 mm. The total length of the cloaking device 100 in the y-axis direction was 140 mm. The total length of the cloaking device 100 in the x-axis direction was 132.2 mm. The cloaking region 110 had an area of about 70 mm by 70 mm. All of the lenses utilized were achromatic cylindrical lenses. Specifically, the first lens 140, the fourth lens 146, the fifth lens 150, and the eighth lens were AC508-100-A lenses having a 508 mm length in the x-axis direction and a focal length of 100 mm (commercially available from Thorlabs, Inc.), and the second lens 142, third lens 144, sixth lens 152, and seventh lens 154 were #48350 lenses having a 12.8 mm length in the y-axis direction and a focal length of 15 mm (commercially available from Edmunds Optics, Inc.). The first mirror 122, fourth mirror 128, fifth mirror 132, and eighth mirror 138 had lengths in the x-y axis plane of 57 mm. The second mirror, 124, third mirror 126, sixth mirror 134, and seventh mirror 136 had lengths in the x-y axis plane of 38 mm. All mirrors had an orientation of 45° relative to the y-axis direction. All lenses had a height in the z-axis direction of 2 inches, achieved by utilizing multiple lenses arranged on top of one another in the z-axis direction. The second mirror 124 and third mirror 126 extended past the first lens 140 and fourth lens 146 by 15.1 mm in the x-axis direction. Similarly, the sixth mirror 134 and seventh mirror 136 extended past the fifth lens 150 and eighth lens 156 by 15.1 mm in the x-axis direction.

Figure 14:
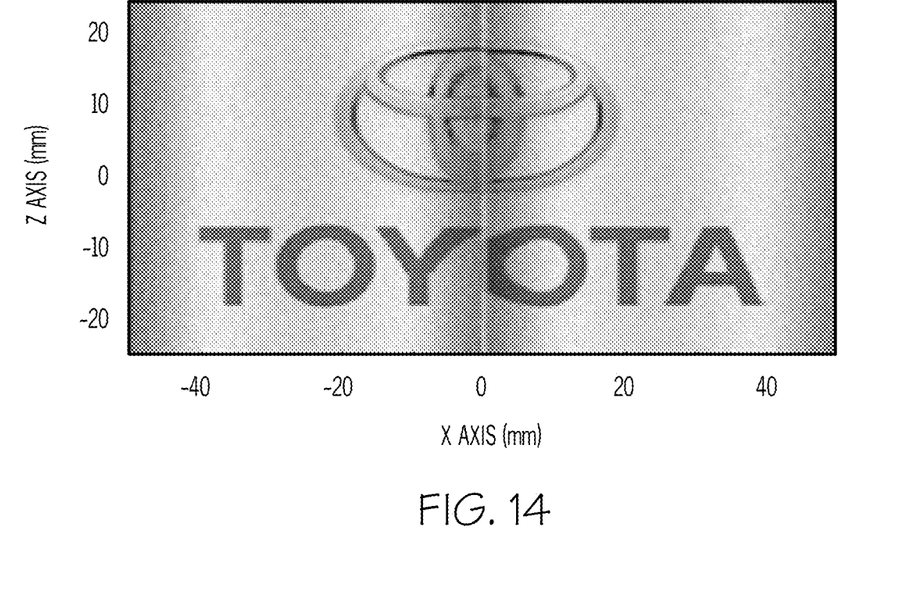
FIG. 14 depicts an image produced by the cloaking device of Example 6, according to one or more embodiments described herein.

FIG. 14 depicts and image produced to a viewer 108 by the cloaking device of Example 6. The chromatic aberrations of Example 2 were reduced by the use of longer focal length lenses.

The terms "generally," "approximately," and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It is also noted that recitations herein refer to a component of the present invention being "configured" in a particular way. In this respect, such a component is "configured" to embody a particular property, or function in a particular manner, where such recitations are structural recitations as opposed to recitations of intended use. More specifically, the references herein to the manner in which a component is "configured" denotes an existing physical condition of the component and, as such, is to be taken as a definite recitation of the structural characteristics of the component.

What is claimed is:

1. A cloaking device comprising:
    a first mirror, a second mirror, a third mirror, and a fourth mirror, wherein the first mirror, the second mirror, the third mirror, and the fourth mirror are configured to direct incoming light around a cloaked region such that incoming light reflects off of the first mirror and towards the second mirror, reflects off of the second mirror and towards the third mirror, reflects off of the third mirror and towards the fourth mirror, and reflects off of the fourth mirror and towards a viewer;
    a first lens, a second lens, a third lens, and a fourth lens, wherein the first lens is positioned to receive the incoming light and project the incoming light onto the first mirror, and the fourth lens is position to receive reflected light from the fourth mirror and project the reflected light towards the viewer, wherein:
    each of the first lens, the second lens, the third lens, and the fourth lens are achromatic cylindrical lenses; or
    each of the first lens, the second lens, the third lens, and the fourth lens are acylindrical lenses.

2. The cloaking device of claim 1, wherein each of the first lens, the second lens, the third lens, and the fourth lens are achromatic cylindrical lenses.

3. The cloaking device of claim 1, wherein each of the first lens, the second lens, the third lens, and the fourth lens are acylindrical lenses.

4. The cloaking device of claim 1, wherein a boundary of the cloaked region is at least partially defined by the first mirror and the fourth mirror.

5. The cloaking device of claim 1, wherein the first mirror, the second mirror, the first lens, and the second lens are symmetric to the third mirror, the fourth mirror, the third lens, and the fourth lens.

6. The cloaking device of claim 1, wherein each of the first mirror, the second mirror, the third mirror, and the fourth mirror are substantially flat.

7. The cloaking device of claim 1, wherein the second lens is positioned between the first mirror and the second mirror, and the third lens is positioned between the third mirror and the fourth mirror.

8. The cloaking device of claim 1, wherein the second lens and the third lens are positioned between the second mirror and the third mirror.

9. The cloaking device of claim 1, wherein the first mirror is about parallel with the second mirror, and the third mirror is about parallel with the fourth mirror.

10. A cloaking device comprising:
    a first mirror, a second mirror, a third mirror, a fourth mirror, a fifth mirror, a sixth mirror, a seventh mirror, and an eighth mirror, wherein:
    the first mirror, the second mirror, the third mirror, and the fourth mirror are configured to direct incoming light around a cloaked region such that incoming light reflects off of the first mirror and towards the second mirror, reflects off of the second mirror and towards the third mirror, reflects off of the third mirror and towards the fourth mirror, and reflects off of the fourth mirror and towards a viewer; and
    the fifth mirror, the sixth mirror, the seventh mirror, and the eighth mirror are configured to direct incoming light around the cloaked region such that incoming light reflects off of the fifth mirror and towards the sixth mirror, reflects off of the sixth mirror and towards the seventh mirror, reflects off of the seventh mirror and towards the eighth mirror, and reflects off of the eighth mirror and towards the viewer;
    a first lens, a second lens, a third lens, and a fourth lens, a fifth lens, a sixth lens, a seventh lens, and an eighth lens, wherein:
    the first lens is positioned to receive the incoming light and project the incoming light onto the first mirror, and the fourth lens is position to receive reflected light from the fourth mirror and project the reflected light towards the viewer; and the fifth lens is positioned to receive the incoming light and project the incoming light onto the fifth mirror, and the eighth lens is position to receive reflected light from the eighth mirror and project the reflected light towards the viewer;

wherein:

each of the first lens, the second lens, the third lens, the fourth lens, the fifth lens, the sixth lens, the seventh lens, and the eighth lens are achromatic cylindrical lenses; or each of the first lens, the second lens, the third lens, the fourth lens, the fifth lens, the sixth lens, the seventh lens, and the eighth lens are acylindrical lenses.

11. The cloaking device of claim 10, wherein each of the first lens, the second lens, the third lens, the fourth lens, the fifth lens, the sixth lens, the seventh lens, and the eighth lens are acylindrical lenses.

12. The cloaking device of claim 10, wherein each of the first lens, the second lens, the third lens, the fourth lens, the fifth lens, the sixth lens, the seventh lens, and the eighth lens are achromatic cylindrical lenses.

13. The cloaking device of claim 10, wherein a boundary of the cloaked region is at least partially defined by the first mirror, the fourth mirror, the fifth mirror, and the eighth mirror.

14. The cloaking device of claim 10, wherein:

the first mirror, the second mirror, the third mirror, and the fourth mirror are symmetric to the fifth mirror, the sixth mirror, the seventh mirror, and the eighth mirror.

15. A vehicle comprising a pillar and a cloaking device, wherein the pillar is at least partially within a cloaked region of the cloaking device, the cloaking device comprising:

a first mirror, a second mirror, a third mirror, and a fourth mirror, where the first mirror, the second mirror, the third mirror, and the fourth mirror are configured to direct incoming light around the cloaked region such that incoming light reflects off of the first mirror and towards the second mirror, reflects off of the second mirror and towards the third mirror, reflects off of the third mirror and towards the fourth mirror, and reflects off of the fourth mirror and towards a viewer;

a first lens, a second lens, a third lens, and a fourth lens, wherein the first lens is positioned to receive the incoming light and project the incoming light onto the first mirror, and the fourth lens is position to receive reflected light from the fourth mirror and project the reflected light towards the viewer, wherein:

each of the first lens, the second lens, the third lens, and the fourth lens are achromatic cylindrical lenses; or each of the first lens, the second lens, the third lens, and the fourth lens are acylindrical lenses.

16. The cloaking device of claim 15, wherein each of the first lens, the second lens, the third lens, and the fourth lens are achromatic cylindrical lenses.

17. The cloaking device of claim 15, wherein each of the first lens, the second lens, the third lens, and the fourth lens are acylindrical lenses.

18. The vehicle of claim 15, wherein the pillar is an A-pillar or a B-pillar.

19. The cloaking device of claim 15, wherein a boundary of the cloaked region is at least partially defined by the first mirror and the fourth mirror.

20. The vehicle of claim 15, wherein the cloaking device further comprises:

a fifth mirror, a sixth mirror, a seventh mirror, and a eighth mirror, where the fifth mirror, the sixth mirror, the seventh mirror, and the eighth mirror are configures to direct incoming light around a cloaked region such that incoming light reflects off of the fifth mirror and towards the sixth mirror, reflects off of the sixth mirror and towards the seventh mirror;

reflects off of the seventh mirror and towards the eighth mirror, and reflects off of the eighth mirror and towards a viewer;

a fifth lens, a sixth lens, a seventh lens, and a eighth lens, wherein the fifth lens is positioned to receive the incoming light and project the incoming light onto the fifth mirror, and the eighth lens is position to receive reflected light from the eighth mirror and project the reflected light towards the viewer, wherein:

each of the fifth lens, the sixth lens, the seventh lens, and the eighth lens are achromatic cylindrical lenses; or each of the fifth lens, the sixth lens, the seventh lens, and the eighth lens are acylindrical lenses.

21. The cloaking device of claim 3, wherein the acylindrical lenses are cylindrical lenses comprising aspheric profiles.

22. The cloaking device of claim 1, wherein one or more of the first lens, the second lens, the third lens, or the fourth lens are positioned between one or more of:

the first mirror and the second mirror;
the second mirror and the third mirror; or
the third mirror and the fourth mirror.

* * * * *

UNITED STATES PATENT AND TRADEMARK OFFICE
CERTIFICATE OF CORRECTION

PATENT NO. : 10,737,623 B2
APPLICATION NO. : 15/435996
DATED : August 11, 2020
INVENTOR(S) : Debasish Banerjee, Chengang Ji and Mayu Takagi Page 1 of 1

It is certified that error appears in the above-identified patent and that said Letters Patent is hereby corrected as shown below:

On the Title Page

Item (71) applicants, applicant 2, city, delete "Toyota" and insert --Toyota City--, therefor.

Signed and Sealed this
Twentieth Day of October, 2020

Andrei Iancu
*Director of the United States Patent and Trademark Office*